Sept. 28, 1954　　　W. J. CASEY III　　　2,690,237
BRAKE HEAD GUIDE

Filed Feb. 17, 1951　　　　　　　　　　2 Sheets-Sheet 1

INVENTOR.
William J. Casey, III.
BY
Atty.

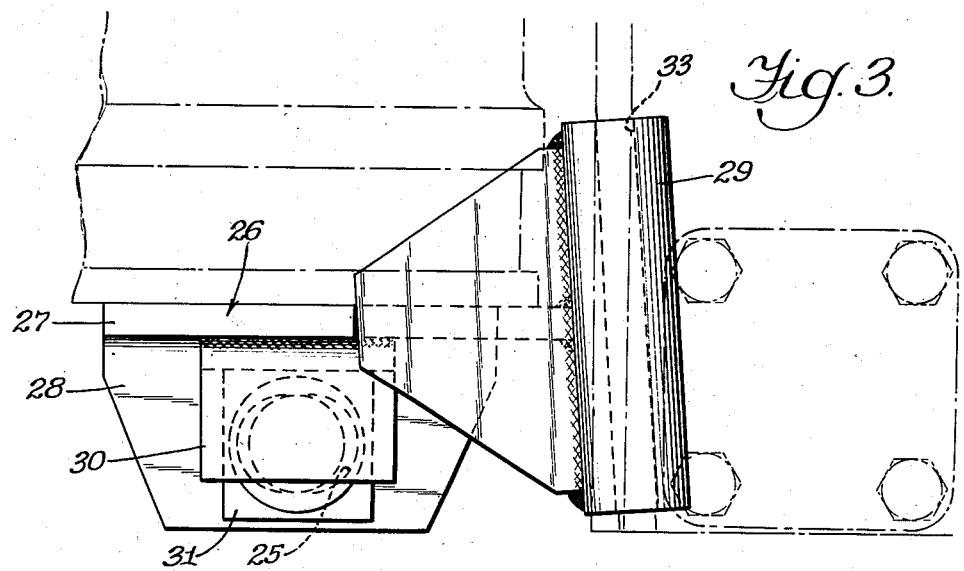
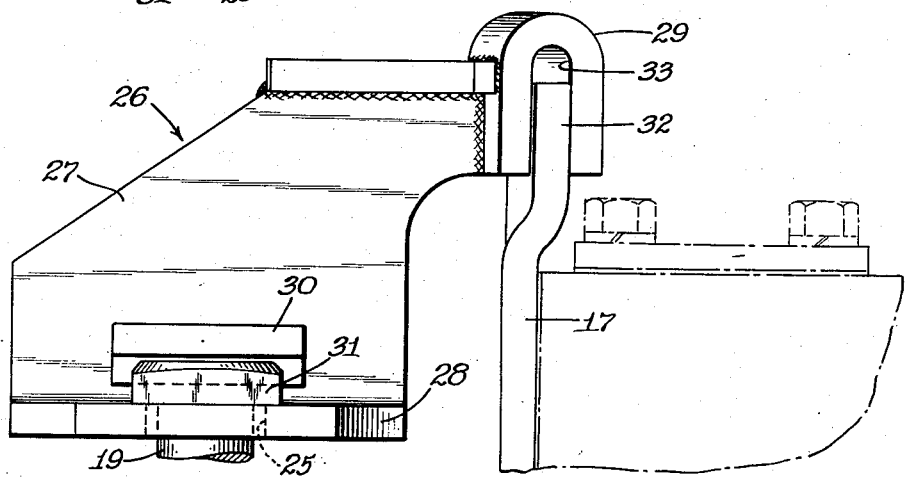
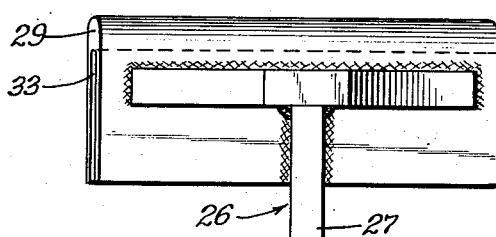

Patented Sept. 28, 1954

2,690,237

UNITED STATES PATENT OFFICE 2,690,237

BRAKE HEAD GUIDE

William J. Casey, III, Chicago, Ill., assignor to American Steel Foundries, Chicago, Ill., a corporation of New Jersey Application February 17, 1951, Serial No. 211,515

15 Claims. (Cl. 188—59)

1

This invention relates to railway brake equipment and is more particularly concerned with the provision of an off-wheel brake arrangement, wherein braking means are provided for decelerating one or more disks or rotors associated with the wheel and axle assemblies of a railway car truck, as shown in a copending application Ser. No. 104,453, filed July 13, 1949, in the name of Carl E. Tack, now Patent No. 2,661,818, issued December 8, 1953.

The present invention contemplates the provision of an off-wheel brake arrangement in which brake disks are supported to rotate with each wheel and axle assembly, a brake frame being carried by the truck frame adjacent each disk, and with each brake frame supporting a pair of levers with brake shoes for frictional engagement with opposite sides of the adjacent disk. To maintain a full-face braking engagement between the brake shoes and the disks, each shoe is mounted for pivotal movement on the end of its lever and guided into and out of engagement with its disk by means of a guide mounted for sliding movement along a guide tongue. To permit free movement of the levers and brake shoes without binding or excessive friction, each guide coacts with its guide tongue to direct its respective shoe along a diagonal line extending parallel to a straight line intersecting the points at the ends of the line of travel of the free end of the lever.

This invention further contemplates the provision of an off-wheel brake arrangement in which the brake shoe guides are secured to their respective brake heads, and the guide tongues are formed as an integral part of the front cover plate of the brake frame cylinder housing to thus reduce the cost of manufacture and to insure proper alignment of parts during assembly and operation.

This invention embodies other novel features, details of construction and arrangement of parts which are hereinafter set forth in the specification and claims and illustrated in the accompanying drawings, wherein:

Figure 3 is a detail plan view showing the brake head guide and guide tongue.

Figure 4 is a side elevational view of same; and

Figure 5 is an end elevational view of same.

Figure 1:
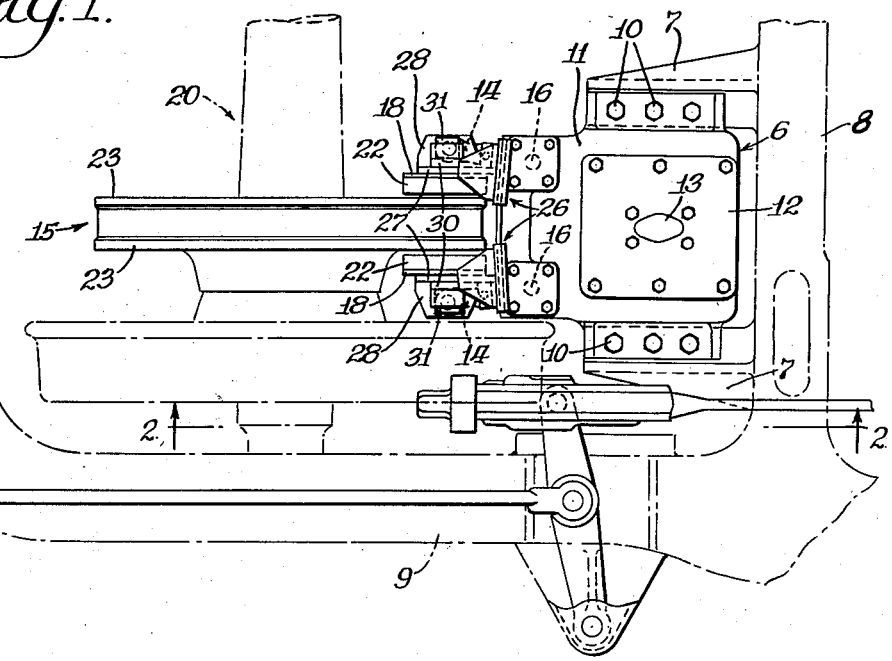
Figure 1 is a top plan view illustrating an off-wheel brake arrangement provided with a brake head guide embodying features of the present invention.
Figure 2:
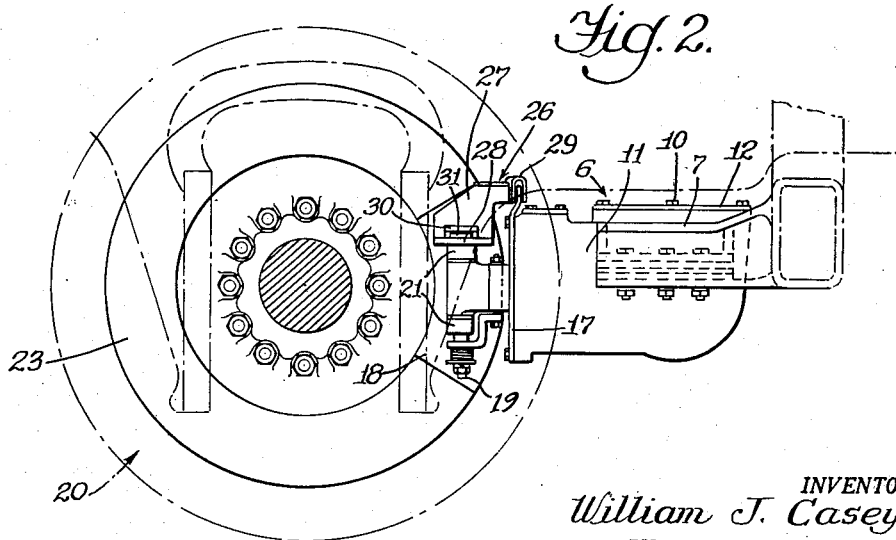
Figure 2 is a sectional view taken along the line 2—2 of Figure 1.

Referring now to the drawings for a better understanding of this invention, the off-wheel brake arrangement is shown as comprising a brake frame 6 supported along its sides upon a pair of arms 7—7 formed on the transom 8 of a truck frame 9. The brake frame 6 is secured to the arms 7—7 by means of bolts 10 and comprises a cylindrical housing 11 adapted to receive a conventional air cylinder or other power means (not shown), the air cylinder being secured to a top cover plate 12 provided with a nozzle 13 for attachment to a fluid supply line (not shown).

A pair of brake lever 14—14 are pivotally mounted at 16—16 on the housing 11 and project through the cover plate 17 of the housing at opposite sides of a disk or rotor 15 supported to rotate with a wheel and axle assembly 20. A brake head 18 is pivoted to the outer end of each lever 14 by means of a pin or bolt 19, each head being provided with spaced lugs 21—21 formed with apertures in registry with an opening formed in its respective lever to receive the bolt. A brake shoe 22 is secured to each brake head 18 by means of rivets and cement to serve as stators for frictional engagement against the faces 23 of the disk 15.

Each brake head 18 is provided with a guide indicated generally at 26 and shown as comprising a body portion 27 having a flange 28 provided on its lower end and an inverted U-shaped portion 29 provided on its upper end. The flange 28 is formed with an ovel-shaped aperture 25 to loosely receive the bolt 19, and is adapted to be engaged between the flat sided head 31 of the bolt and the adjacent apertured lug 21 formed on the brake head 18. An angle plate 30 is welded to the body portion 27 to engage the bolt head 31 against relative axial or rotational movement. To prevent relative rotational movement, the body 27 of the guide is disposed in flat abutting engagement against the outer face of the brake head.

The front cover plate 17 of the housing 11 is formed along its upper edge with a pair of upwardly projecting guide tongues 32—32 for sliding engagement within the recess 33—33 defined by the inverted U-shaped portions 29—29. It will be noted that the guide tongues 32—32 diverge rearwardly to cause the guides 26—26 to move along diagonal lines of travel during operation of the brake levers 14—14. By referring to Figure 1, it will be noted that the ends of the brake levers 14—14 move slightly toward the axis of the disk 15 when the brake shoes 22—22 are applied for braking engagement against the disk faces 23—23.

In order to prevent binding or excessive friction between the levers 14—14, guides 26—26 and the guide tongues 32—32, it is thus necessary to have the guide tongues disposed diagonally with respect to the axis of the disk. The inner ends of the brake levers 14—14 are adapted to be engaged and actuated during operation by a conventional power means such as an air cylinder (not shown) provided within the housing 11.

While this invention has been shown in but one form, it is obvious to those skilled in this art that it is not so limited but is susceptible of various changes and modifications without departing from the spirit and scope of the claimed invention.

I claim:

1. In a brake arrangement for a railway car truck, a wheel and axle assembly including a friction element rotatable therewith, a support structure, brake means carried by said structure including a pair of levers supported for pivotal movement toward opposite sides of said element, brake shoes pivotally connected to said levers for braking engagement with opposite sides of said element, guide members connected for common movement with said shoes, and guide tongues secured in fixed position on said support structure for sliding engagement with said guide members, said guide tongues being disposed in diagonal planes converging toward said friction element.

2. In a brake arrangement for a railway car truck, a wheel and axle assembly including a friction element rotatable therewith, a support structure, brake means carried by said structure including a pair of levers diagonally disposed for pivotal movement toward opposite sides of said element, brake shoes pivotally connected to said levers for braking engagement with opposite sides of said element, guide members connected for common movement with said shoes, and guide tongues secured in fixed position on said support structure for sliding engagement with said guide members, said guide tongues being disposed diagonally with respect to said friction element and converging toward a vertical plane through the axis of rotation of the latter.

3. In a brake arrangement for a railway car truck, a wheel and axle assembly including a friction element rotatable therewith, a support structure, brake means carried by said structure including a pair of levers diagonally disposed for pivotal movement toward opposite sides of said element, brake shoes pivotally connected to said levers for braking engagement with opposite sides of said element, guide members connected for common movement with said shoes, and guide tongues provided on said support structure for sliding engagement with said guide members, said guide tongues being disposed diagonally with respect to said friction element and converging toward a vertical plane through the axis of rotation of the latter, said support structure comprising a housing pivotally supporting said levers, and a cover plate detachably mounted on said housing, said levers projecting through said cover plate, said guide tongues being formed as integral parts of said cover plate and diverging rearwardly therefrom.

4. In a brake arrangement for a railway car truck, a wheel and axle assembly including a friction element rotatable therewith, a brake frame, brake means carried by said brake frame and including a shoe for braking engagement with said element, and means comprising a guide member connected to said shoe and a tongue fixed to said brake frame and slidably engaging said guide member to guide the shoe diagonally toward and away from a vertical plane through the axis of rotation of said element.

5. In a brake arrangement for a railway car truck, a wheel and axle assembly including a friction element rotatable therewith, a brake frame, brake means carried by said brake frame including a pair of brake shoes disposed at opposite sides of said element, guide means connected for common movement with said shoes, and other guide means secured in fixed position on said brake frame to engage and direct said guide means and shoes diagonally toward and away from a vertical plane through the axis of rotation of said friction element.

6. In a brake arrangement for a railway car truck, a wheel and axle assembly including a friction element rotatable therewith, a brake frame, brake means carried by said brake frame including a pair of brake shoes disposed at opposite sides of said element, guide means connected for common movement with said shoes, and other means provided on said brake frame to engage and direct said guide means and shoes diagonally toward and away from a vertical plane through the axis of rotation of said friction element, said other means comprising a pair of guide tongues secured in fixed position on the upper surface of said brake frame and disposed to converge toward said vertical plane through the axis of rotation of said friction element.

7. In a brake arrangement for a railway car truck, a wheel and axle assembly including a rotor rotatable therewith, a support, brake means carried by said support including stators disposed at opposite sides of said rotor for braking engagement therewith, and guide means secured in fixed position on said support to engage and direct the stators diagonally toward and away from a vertical plane through the axis of rotation of said rotor.

8. In a brake arrangement for a railway car truck, a wheel and axle assembly including a friction element rotatable therewith, a support, brake levers carried by said support, brake shoes carried by respective levers at opposite sides of said element for braking engagement therewith, and guide means carried by the support independently of said levers and engaging said support to said shoes for directing the latter diagonally toward and away from a vertical plane defining the axis of rotation of said element, said guide means including spaced diagonal guide tongues fixed on said support and converging toward said element.

9. In a brake arrangement for a railway car truck having a wheel and axle assembly including a rotor rotatable therewith, a support, brake means carried by said support including stators movable into frictional engagement against opposed sides of said rotor, and guide means interconnecting said support with said stators and operative to direct the latter along diagonal lines toward and away from said rotor, said guide means including a pair of guide tongues secured in fixed position on said support and disposed in diagonal planes converging from the support outwardly toward a vertical plane through the axis of rotation of said rotor.

10. In a brake arrangement, a wheel and axle assembly including an element with radial braking faces on opposite sides thereof, a frame supported adjacent said element, brake means including a pair of levers carried by said frame and disposed at opposite sides of said element, a stator at each side of said element adapted for engagement with the adjacent face, a bolt connecting each stator to the adjacent lever accommodating rotation of the former on a substantially vertical axis, the axes of rotation of said stators being aligned transversely of said faces, a guide member on each stator connected thereto by the associated bolt, each member comprising an arm seated against the side of the associated stator remote from said element and extending substantially parallel to the plane thereof, means on said frame presenting guide surfaces extending diagonal to the plane of said axes, and an extension on the end of the arm of each member remote from the associated stator extending transversely thereof, each extension having a U-section portion defining a slot receiving said last-mentioned means therein and presenting substantially parallel sides engageable with said surfaces for guiding the related stator with respect to the adjacent braking face, and abutment means provided on each guide member to engage the associated bolt against relative axial or rotational movement.

11. In a brake arrangement for a railway car truck having a wheel and axle assembly and a rotor rotatable therewith, a support adapted to be mounted on the truck, brake levers fulcrumed on substantially vertical axes to said support and including stators movable toward and away from opposed sides of said rotor, and means to guide said stators with respect to said rotor comprising guide surfaces carried by said support independently of said levers, said guide surfaces converging from the plane of said axes toward said rotor, and guides movable with related stators slidably engaging their respective guide surfaces to maintain the stators in proper alignment during such movement.

12. In a brake arrangement for a railway car truck having a wheel and axle assembly and a rotor rotatable therewith, a support adapted to be mounted on the truck, brake means carried by said support and including stators movable toward and away from opposed sides of said rotor and pivotal on substantially vertical axes, and means to guide said stators with respect to said rotor comprising guide tongues secured in fixed position on said support and converging from the plane of said axes toward said rotor, and guides movable with related stators slidably engaging their respective guide tongues to maintain the stators in proper alignment during such movement.

13. In a brake arrangement for a railway car truck having a wheel and axle assembly and a rotor rotatable therewith, a support adapted to be mounted on the truck, brake means carried by said support and including stators movable toward and away from opposed sides of said rotor and pivotal on substantially vertical axes, and means to guide said stators with respect to said rotor comprising guides secured in fixed position on said support and converging from the plane of said axes toward said rotor, and guides movable with related stators slidably engaging the respective guides on said support to maintain the stators in proper alignment during such movement, each guide being in tongue and groove engagement with the related guide.

14. In a brake arrangement, a railway car truck having a wheel and axle assembly including a rotor rotatable therewith, a support mounted on said truck, brake means carried by said support including brake levers movable toward and away from opposed sides of said rotor, a stator assembly comprising a brake head and brake shoe pivotally connected on each lever for movement about a substantially vertical axis, and means to guide said stator assemblies during movement of the latter with respect to said rotor comprising guide tongues fixed on said support, and guides engaged for common movement with their respective stator assemblies and slidably engaging their related guide tongues to maintain the assemblies in proper alignment during such movement, said guide tongues being in diagonal planes converging from the plane of said axes toward said rotor.

15. In a brake arrangement, a railway car truck having a wheel and axle assembly including a rotor rotatable therewith, a support mounted on said truck, brake means carried by said support including brake levers movable toward and away from opposed sides of said rotor, a stator assembly comprising a brake head and brake shoe pivotally connected on each lever for movement about a substantially vertical axis, and means to guide said stator assemblies during movement of the latter with respect to said rotor comprising guide tongues fixed on said support, and guides engaged for common movement with their respective stator assemblies and slidably engaging their related guide tongues to maintain the assemblies in proper alignment during such movement, said guide tongues being in diagonal planes converging from the plane of said axes toward said rotor, each guide tongue being engaged within a U-shape portion formed on its related guide.

References Cited in the file of this patent

UNITED STATES PATENTS

| Number | Name | Date |
|---|---|---|
| 2,228,818 | Eksergian | Jan. 14, 1941 |
| 2,423,694 | Eksergian et al. | July 8, 1947 |
| 2,527,072 | Pogue | Oct. 24, 1950 |